United States Patent [19]
Andersen et al.

[11] Patent Number: 6,043,465
[45] Date of Patent: Mar. 28, 2000

[54] TEMPERATURE MEASUREMENT DEVICE FOR FURNACE HEATING ELEMENTS, FURNACE UTILIZING SAID DEVICE AND METHOD OF USING THE SAME

[75] Inventors: Ingar Fred Andersen; Paul R. Cote, both of Bow, N.H.

[73] Assignee: Thermal Technology, Inc., Concord, N.H.

[21] Appl. No.: 09/096,642

[22] Filed: Jun. 12, 1998

[51] Int. Cl.[7] .................................................. H05B 1/02
[52] U.S. Cl. ...................................... 219/497; 219/505
[58] Field of Search ................................. 219/497, 505, 219/499, 501

[56] References Cited

U.S. PATENT DOCUMENTS

| | | |
|---|---|---|
| 3,798,416 | 3/1974 | Brouneus . |
| 3,920,956 | 11/1975 | Endo . |
| 4,162,379 | 7/1979 | Sebens . |
| 4,322,604 | 3/1982 | Kawamura et al. ............... 219/497 |
| 4,327,268 | 4/1982 | Frank ................................. 219/497 |
| 4,668,851 | 5/1987 | Kupper . |
| 4,726,333 | 2/1988 | Verheyen ....................... 123/145 A |
| 4,858,576 | 8/1989 | Jeffries et al. ................. 123/145 A |
| 5,464,965 | 11/1995 | McGregor . |
| 5,521,850 | 5/1996 | Moe . |
| 5,719,378 | 2/1998 | Jackson, Jr. et al. ............ 219/497 |
| 5,729,456 | 3/1998 | Boisvert et al. .................... 701/99 |

*Primary Examiner*—Teresa Walberg
*Assistant Examiner*—Jeffrey Pin

*Attorney, Agent, or Firm*—William B. Ritchie; Michael J Persson

[57] ABSTRACT

The present invention is a temperature measurement device for furnace heating elements, a furnace utilizing the temperature measurement device and a method for measuring a temperature of the heating element utilizing the temperature measurement device. In its most basic form, the temperature measurement device of the present invention comprises a first electrical connector for carrying a first input signal from a heating element of a furnace, a second electrical connector for carrying a second input signal from a transformer of the furnace, a voltage measurement device in electrical connection with the first input signal and the second input signal, a current measurement device in electrical connection with the first input signal and the second input signal, a resistance measuring device in electrical communication with the voltage measurement device and the current measurement device for calculating the resistance of the heating element, and a temperature calculator in electrical communication with the resistance measuring device for comparing the resistance of the heating element with a plurality of predetermined resistance versus temperature relationships to determine a temperature of the heating element corresponding to the resistance of the heating element. The preferred temperature measurement device includes a summing device for determining a difference in a voltage between the first input signal and the second input signal and a dividing device for dividing a voltage through the heating element by a current through the heating element to determine the resistance of the heating element.

11 Claims, 4 Drawing Sheets

# TEMPERATURE MEASUREMENT DEVICE FOR FURNACE HEATING ELEMENTS, FURNACE UTILIZING SAID DEVICE AND METHOD OF USING THE SAME

FIELD OF THE INVENTION

The present invention relates to the field of temperature measurement and, in particular, to the measurement of the temperature of an electric heating element for a high temperature furnace by means of its resistance characteristics.

BACKGROUND OF THE INVENTION

Methods for measuring temperatures of high temperature, electrically heated furnaces have long been known and include thermal, electric and optical technology. Commonly, thermocouple sensors are used for temperatures in the lower ranges while optical pyrometry is used for the higher ranges. Other known methods of temperature measurement include power transducers which measure power applied to the heater and then relate this data to temperatures for a particular condition, acoustic probes which relate speed of sound to temperature, and gas flow probes that relate the measurement of viscosity of the gas to temperature. However, the latter two methods, acoustic and viscosity, are not of significance in the field of high temperature furnaces and thus will not be discussed further.

In high temperature furnace applications, energy is transferred from the heating element to the work primarily by radiation. The transfer of heat relates to a function of temperature difference between the element and the work. It is also a function of surface emissivities and geometry. Heating element materials and shapes of heating elements determine the level at which they can operate. Temperatures in excess of certain levels can be detrimental or destructive to the element material. Measurement of heating element temperature through conventional means such as thermal, electrical, and optical requires the use expensive probes and instruments and does not allow the same instrument to be used for the measurement of the temperature of the work at the same time. However, for the optimum use of the equipment, a correct level of element temperature is of extreme importance.

Temperature measurement in high temperature furnaces involves two primary methods. One is the use of a thermocouple that can be used to measure the work, the plenum or the heating element or other parts of the furnace interior. The limitation of the use of a thermocouple is associated with the selection of the active element materials as well as insulation. Very seldom are thermocouples used for temperatures in excess of 2000° Celsius. Often a mechanism for withdrawing a thermocouple and having an optical device take over the reading is used for applications where temperatures are greater than 2000° Centigrade. Thermocouples used for measuring the heating element are subject to early failure because during rapid application of energy, heating elements will reach a higher temperature than at steady-state condition and heating elements also operate at a higher temperature than that which is specified for the work. For temperatures of certain type furnaces that operate to 3000° Centigrade, it is impossible to measure the heating element temperature with a thermocouple. Further, if a thermocouple is used for measuring temperature of the heating element, it ties up one channel of instrumentation which otherwise could be used to measure temperature of the work. Therefore, a compromise is typically made by having the thermocouple read a furnace interior temperature or temperature in the uniform zone where it reads temperature which will be the temperature that the work eventually will reach under steady-state conditions, which is lower than the temperature of the heating element.

The other method of temperature measurement currently used is optical reading. The typical optical system consists of a pyrometer or an infrared thermometer which views the heat through a window and determines the temperature by infrared detection. This system is used primarily for higher temperature levels, and its accuracy is dependent upon certain factors such as emissivity settings and condition of the window. This instrument can be used to measure temperature on the heating element as well as any other objects in line of sight. Since the instrument requires the window which is usually located on a port in the vessel of the furnace and employs a rather expensive instrument, typical application often uses only one or seldom more than three optical reading devices. If a device is used to measure the heating element, as in the case with the thermocouple, it does not read the work temperature and vice versa.

SUMMARY OF THE INVENTION

The present invention is a temperature measurement device for furnace heating elements, a furnace utilizing the temperature measurement device and a method for measuring a temperature of the heating element utilizing the temperature measurement device.

In its most basic form, the temperature measurement device of the present invention comprises a first electrical connector for carrying a first input signal from a heating element of a furnace, a second electrical connector for carrying a second input signal from a transformer of the furnace, a voltage measurement device in electrical connection with the first input signal and the second input signal, a current measurement device in electrical connection with the first input signal and the second input signal, a resistance measuring device in electrical communication with the voltage measurement device and the current measurement device for calculating the resistance of the heating element, and a temperature calculator in electrical communication with the resistance measuring device for comparing the resistance of the heating element with a plurality of predetermined resistance versus temperature relationships to determine a temperature of the heating element corresponding to the resistance of the heating element. The preferred temperature measurement device includes a summing device for determining a difference in a voltage between the first input signal and the second input signal and a dividing device for dividing a voltage through the heating element by a current through the heating element to determine the resistance of the heating element. In one embodiment, the temperature calculator comprises an operational amplifier for measuring a voltage within a predetermined range, an analog to digital converter for converting the voltage into a digital signal, and an electronic lookup table comprising a computer having a data storage device for storing the plurality of predetermined resistance versus temperature relationships and a microprocessor for converting the voltage to a resistance of the heating element and comparing the resistance with the plurality of predetermined resistance versus temperature relationships to determine the temperature of the heating element.

In its most basic form, the furnace of the present invention comprises a transformer, at least two cables in electrical connection with the transformer, at least one heating element in electrical connection with the cables, and a temperature measuring device of the present invention. The preferred furnace includes cables that are sized and calibrated to function as drop resistors and further comprises a vessel for separating the transformer from the at least one heating element, and at least two power feed throughs connected between the at least two cables and the at least one heating element for carrying power from the cables, through the vessel to the heating element. In some embodiments, a three phase system may be substituted for the single phase system described.

The basic method of the present invention comprises the steps of supplying power from a transformer to the heating element, measuring a voltage and a current across the transformer, measuring a voltage and a current across the heating element, calculating a voltage difference between the voltage across the transformer and the voltage across the heating element, dividing the voltage difference by the current across the heating element to obtain a resistance across the heating element, and calculating a temperature of the heating element based upon the resistance across the heating element. In the preferred method, the step of calculating a temperature of the heating element comprises the step of comparing the resistance across the heating element with a with plurality of predetermined resistance versus temperature relationships to determine the temperature of the heating element.

Therefore, it is an aspect of the invention to provide a temperature measurement and control system to measure and control the temperature of an electric heating element without the use of a temperature sensing device.

It is a further aspect of the invention to provide a temperature measurement and control system to measure and control multiple sections and/or phases of heating elements independent of the others within a furnace enclosure without the use of conventional temperature sensors.

It is a further aspect of the invention to provide a temperature measurement and control system to control the temperature of the heating element within the furnace enclosure to a pre-programmed temperature which will prevent overheating of the element while maximizing heat transfer to the work.

It is a further aspect of the invention to provide a temperature measurement and control system to control the temperature of the heating element within the furnace enclosure to a pre-programmed temperature which will optimize temperature distribution within the furnace enclosure under transient and steady-state conditions.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE DRAWINGS

Figure 1:
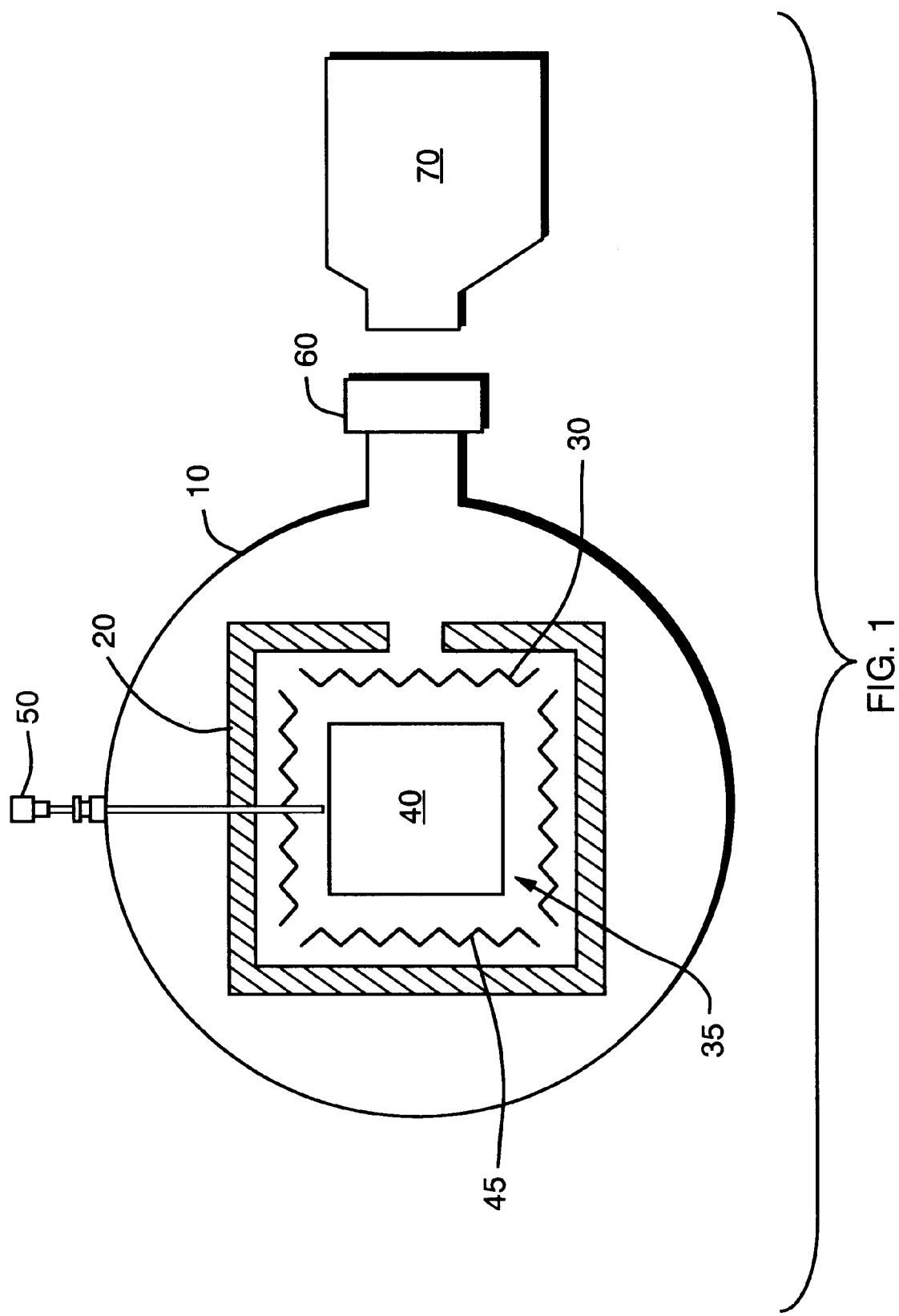
FIG. 1 is cutaway front view of a conventional furnace utilizing a thermocouple and optical pyrometer for temperature measurement.

Referring first to FIG. 1, a high temperature furnace using conventional temperature measurement systems is shown. This prior art system includes a vessel 10 separating the furnace interior atmosphere from the ambient, an array of insulation 20, or shielding, disposed between the heated portion of the furnace interior and the vessel 10, and an array of heating elements 30 disposed interior of the array of insulation 20. Heating elements 30 typically are fabricated from shapes of either strip, wire mesh, wire weave, or rod with typical materials being tungsten, molybdenum, or tantalum, though other shapes and materials may also be used.

The work 40 is located within the heated zone 35 and is subjected to radiant energy from two or more sides. A thermocouple 50 typically penetrates into the heated zone and can be employed to measure the temperature at the work 40, the temperature in the furnace interior 45, or the temperature on the heating elements 30 themselves. An optical pyrometer 70, which detects the temperature of a heating element 30 or the work 40 by measuring certain wavelengths of energy, is mounted adjacent a transparent viewing port 60 and is employed to measure temperature other than that being measured by the thermocouple 50. As noted in the background, these measurement techniques present drawbacks that are overcome by the present invention.

It has been known for some time that certain materials, tungsten, tantalum, and molybdenum, in particular, have a large change of resistance ratio through the range of operating temperatures. For example, tungsten changes its resistance ratio by a factor of 20 between room temperature and 3000° Centigrade. Because of the sensitivity of resistance to temperature, and the generally repetitive nature of this sensitivity, resistance may be used as a measure of temperature.

The apparatus of the present invention measures voltage and current through the heating element 30 and electronically divides the voltage by the current to arrive at a value that can be related to temperature. As the only variable that affects resistance is temperature, the ratio of voltage to current at any power level will reveal a true measurement of temperature. Using this method, temperature for any number of electrically separated element sections within the furnace can be measured without the introduction of a separate device such as an optical pyrometer or a thermocouple probe.

It is recognized that differences in materials and geometries will create an inherent degree of error in the temperatures measured using this method. However, there is a difference between temperature measurement and control. Measurement is a procedure by which the exact temperature of the object is established, often with reference to the National Bureau of Standards which limits the use of devices to those which have been previously approved and that can be traced to an authorized standard. The present invention does not intend to provide an exact measure referenced to a standard. Rather, the present invention addresses itself primarily toward control and, in particular, where multi-zone application is involved.

In a control application, a bias is entered into the temperature control that relates the resistance-measured temperature on the heater to the actual temperature on the work, measured by a thermocouple or optical pyrometer. As there is always a difference between the element temperature and the work temperature, regardless of method used for measurement, it is this bias or offset of the element temperature to the work temperature that is maintained.

Figure 2:
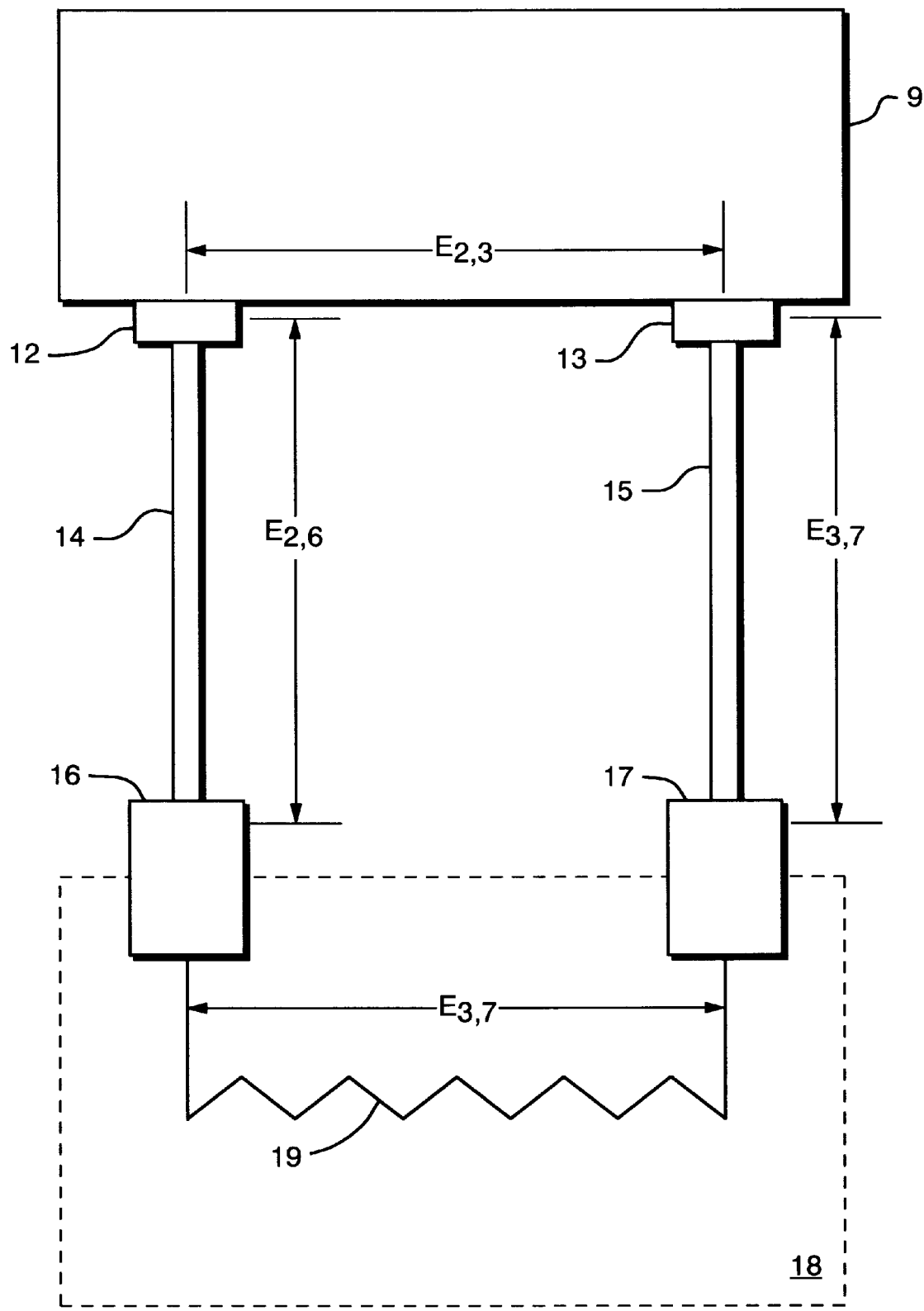
FIG. 2 is a cutaway front view of a typical furnace electrical hookup for single phase power.

Referring now to FIG. 2, a typical furnace electrical hookup for single phase power is shown. The transformer 9, or power supply, has two connecting points 12, 13 to which cables 14, 15 are connected. The other end of the cables 14, 15 are connected to the furnace power feed-throughs 16, 17. The function of the power feed-throughs 16, 17 is to carry electric current through the vessel 18 that separates the interior of the furnace from the ambient. Heating element 19, typically made from a refractory metal such as tungsten, is connected to the other ends of power feed-throughs 16, 17.

In order to measure the resistance of the heating element 19, it is necessary to know the current and the voltage passing through the heating element 19. The current is commonly measured by means of what is referred to as a current transformer which is a donut-shaped winding that acts as a secondary of a transformer with the primary being the cable which runs through the center of the donut-shaped coil. The resulting current from this coil is used as a measure of the current flowing through the cable. Another suitable method is the use of a drop resistor manufactured from a special alloy of high temperature conductivity and precise dimensions. The voltage read across this drop resistor becomes representative of the current flowing through the conductor.

However, the preferred method of measuring current utilizes the cables 14, 15 of FIG. 2 for current measurement. Typically, in a furnace of the type discussed here, the combined voltage drop in the cables ($E_{2,6} + E_{3,7}$) represents 5 to 10 percent of the total voltage ($E_{2,3}$) at maximum operating temperature of the heating element. At lower element temperatures the heating element resistance is lower while the cable resistance remains constant. Therefore, the cable resistance vs. element resistance ratio increases with decreasing element temperature, with the current being determined from the voltage drop in the cable divided by the resistance.

The preferred embodiment of the present invention utilizes carefully sized and calibrated cables that transmit the power to the heating element and also function as drop resistors, eliminating the need for a separate current transformer or a drop resistor. Typically, the resistance of the cables 14, 15 (which for most applications are of the water-cooled copper type) is constant since it is not subject to significant temperature fluctuations. The heating element 19 is a typical refractory metal fabricated system where approximately 90% of resistance is contributed by the portion of the element that sees the full range of temperature variation. The portions of the element 19 that connect through the power feed-throughs 16, 17 have a temperature gradient that slopes from maximum to near room temperature. The overall resistance however can be readily calculated and measured and follows a near linear curve for the resistance temperature ratio.

The following example demonstrates the mathematical relationship under which the present invention functions. However, it should be recognized that though the example is based on the use of cable voltage drop as a measure of current, calibrated drop resistors or current transformers may also be used to achieve similar results.

For a certain temperature the heating element will have as a function of temperature a resistance $R_{6,7}$ with a voltage of $E_{6,7}$ and current $I_{6,7}$. The resistance is determined by measuring $E_{6,7}$ and $I_{6,7}$, and by Ohm's law $R_{6,7} = [E_{6,7} \div I_{6,7}]$ The current $I_{6,7}$ is the same as the cable current $I_{2,6}$ and $I_{3,7}$ and thus $I_{6,7} = I_{2,6} = I_{3,7} = [E_{2,6} \div R_{2,6}] = [E_{3,7} \div R_{3,7}]$ Therefore, the voltage readings $E_{2,6}$ or $E_{3,7}$ or both may be used in current measurement. Voltages $E_{2,6}$ and $E_{3,7}$ are typically in the millivolt range and thus it may be advantageous to carry the higher voltages $E_{2,3}$ and $E_{6,7}$ to the control instrument in order to minimize the effect of electromagnetic interference.

Since $E_{2,3} = [E_{2,6} + E_{6,7} + E_{3,7}]$

Then $[E_{2,6} + E_{3,7}] = [E_{2,3} - E_{6,7}]$

And $I_{6,7} = [E_{2,3} - E_{6,7}] \div [R_{2,6} + R_{3,7}]$

NOTE: $R_{2,6}$ and $R_{3,7}$ are constant cable resistances

Resistance $R_{6,7} = [E_{6,7} \div I_{6,7}] = E_{6,7} \div [(E_{2,3} - E_{6,7}) \div (R_{2,6} + R_{3,7})] =$ Resistance $R_{6,7} = [E_{6,7}(R_{2,6} + R_{3,7})] \div [E_{2,3} - E_{6,7}]$

OR $[E_{6,7} \div (E_{2,3} - E_{6,7})] \times [(R_{2,6} + R_{3,7})]$

Figure 3:
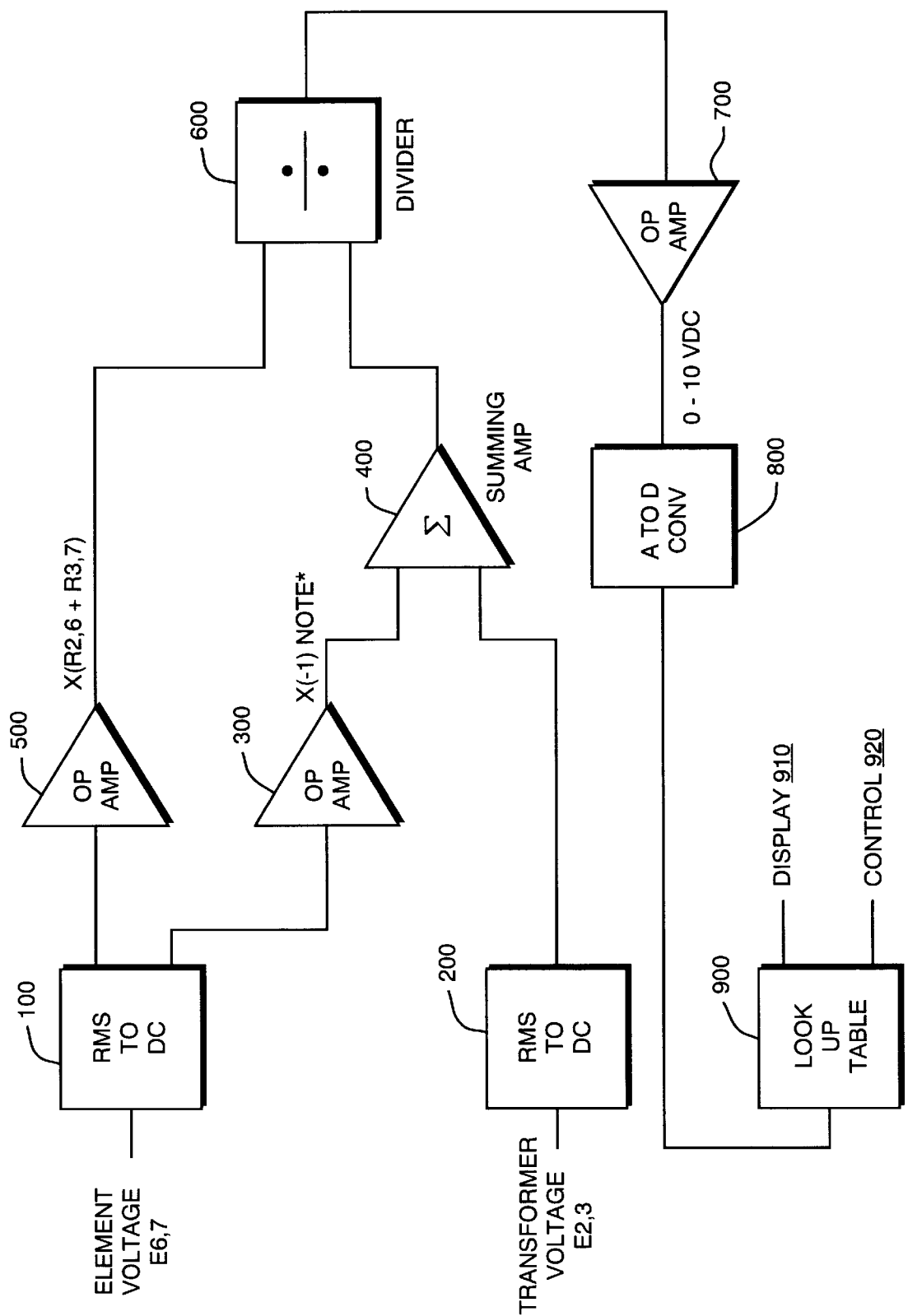
FIG. 3 is a circuit diagram of the temperature measurement circuit of the present invention.

FIG. 3 illustrates the preferred electrical circuit for treating the input signals for purposes of display and control in a single phase application. Two inputs are applied, the element connection voltage $E_{6,7}$ and the transformer output voltage $E_{2,3}$. Both signals are fed through a RMS to DC converter 100, 200. The signal from the element voltage $E_{6,7}$ is channeled in two directions. One is to an operational amplifier 500 which has the gain as a function of the fixed cable resistance. A ten-turn potentiometer within a resistor network is adapted to provide this adjustment. The second branch of the $E_{6,7}$ signal is also fed to an operational amplifier 300 where the gain is fixed at −1 in order to provide the signal as a negative value. The signal from the transformer voltage $E_{2,3}$ along with the negative signal mentioned before is set to the summing amplifier 400 where the difference signal is fed to the divider 600. In the divider circuit the signal from the operational amplifier 500 with the positive gain is divided by the signal from the summing amplifier 400. The resulting signal is fed to an operational amplifier 700 which produces a 0 to 10 volt output signal comparable with most control and recording instruments in use. This signal represents the resistance of the heating element, which is near linear with temperature, for the refractory metals described earlier. For applications where a more accurate measure of element temperature is important, the signal from the 0–10 operational amplifier is fed through an analog to digital converter 800 to a look up table 900 based on the resistance vs. temperature for the application. The resulting signal is fed to display and/or control systems.

The preferred device of the present invention also incorporates all necessary power supplies, adjustments, terminals and mechanical hardware. A selector switch for single-phase vs. three-phase application is also incorporated to allow switching in an additional fixed gain factor for three-phase use.

Figure 4:
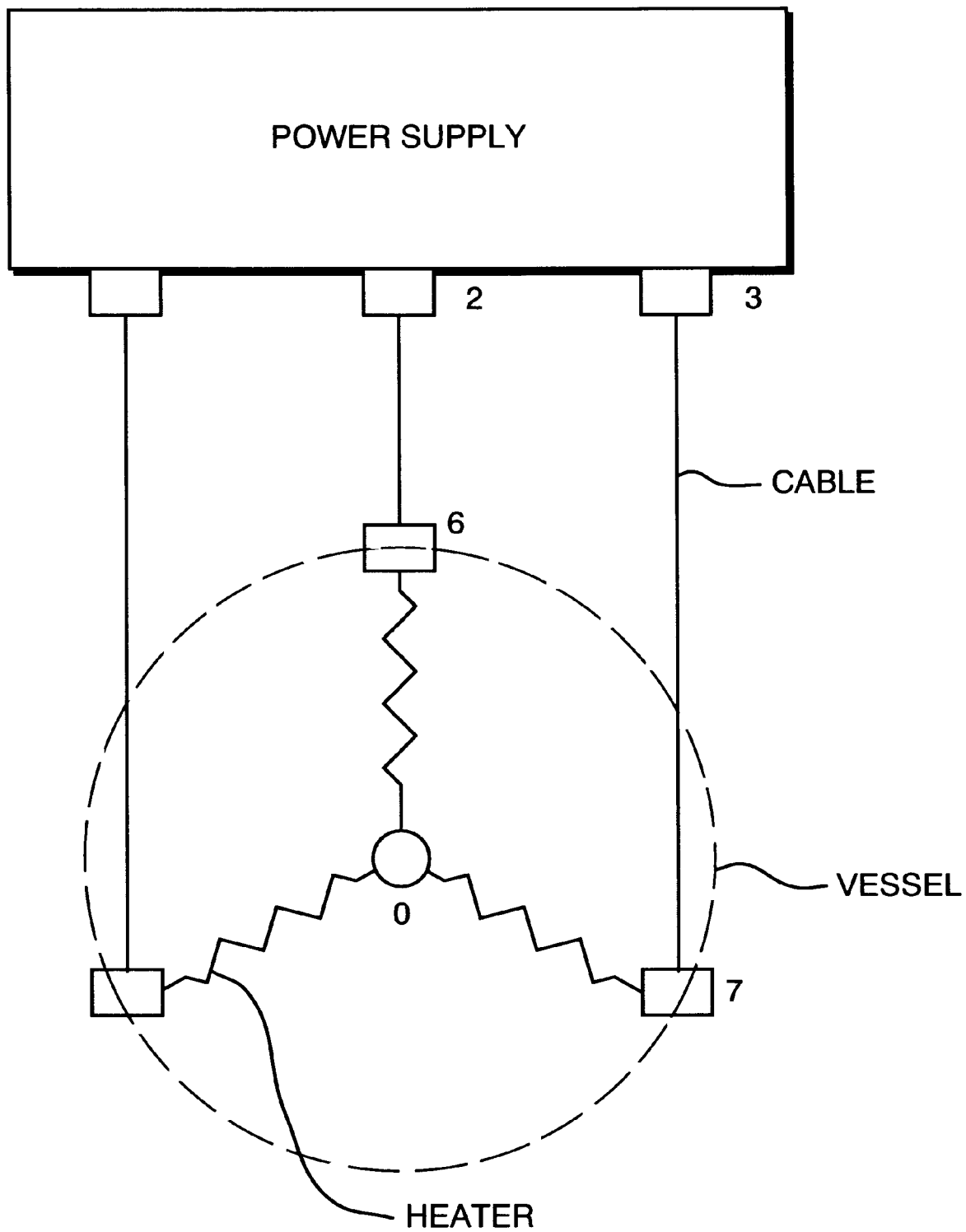
FIG. 4 is a schematic view of a typical furnace electrical hookup for three phase power.

Though the foregoing description has centered on single phase applications, three phase, multiple single phase, and two phase converted from three phase are typical for furnace heating. FIG. 4 illustrates a very common heater arrangement for high temperature applications. The three phase application described with reference to FIG. 4 represents a balanced system where cable lengths are matched to the components within the heating element. Temperature measurement is based upon determination of the line-to-neutral resistance, here assuming that the element and cables are balanced; though such a relationship is not necessary to achieve the desired results.

Therefore:

$E_{6,0} = E_{7,0} = E_{6,7} \div \sqrt{3}$ $R_{7,0} = E_{7,0} \div I_{7,0}$ $I_{7,0} = I_{3,7} = E_{3,7} \div R_{3,7}$ Assuming balance:

$I_{2,6} = I_{3,7} = (E_{2,6} + E_{3,7}) \div (R_{2,6} + R_{3,7})$ $E_{2,3} = E_{2,6} + E_{6,7} + E_{3,7}$ From which follows:

$E_{2,6} + E_{3,7} = E_{2,3} - E_{2,6}$

Thus:

$I_{3,7} = (I_{2,6}) = (E_{2,3} - E_{6,7}) \div (R_{2,6} + R_{3,7})$

And:

$$R_{7,0} = E_{7,0} \div I_{7,0} = (E_{6,7} \div \sqrt{3}) \div ((E_{2,3} - E_{6,7}) \div (R_{2,6} + R_{3,7})) =$$

$$(E_{6,7}(R_{2,6} + R_{3,7})) \div ((\sqrt{3})(E_{2,3} - E_{6,7}))$$

Where:

E is the element line to neutral voltage.

R is the resistance through the element legs

I is the current through the element legs; and $E_{2,3} - E_{2,6}$ is a measured quantity.

The same measuring circuit as shown in FIG. 3 may be used with the three phase system using the negative of the square root of three as a multiplier. Monitoring one phase will adequately provide temperature measurement of the heater but more accuracy and assurance in case of abnormal operation can be achieved by monitoring two or all three phases. In these applications, as with the single phase example, the difference in voltage between the transformer and the power feed-throughs is used for the determination of cable current.

The temperature measurement device of the present invention allows a user of a furnace, as described above, to control furnace temperature without the use of a thermocouple or optical sensing device. In its preferred form, the device of the present invention will be packaged as a stand-alone unit for attachment to existing furnaces. However, the full scope of the invention contemplates use of the device in new furnaces as well. In some applications the temperature measurement device of the present invention may be used in conjunction with other sensors and thus integrated into a wider control scheme. The basic embodiment of the device is intended to work as a single-phase or one leg of a three-phase system. This embodiment includes calibration adjustment using simple ten-turn potentiometers and requires readout on the user's instrument via terminals supplied. The calibration incorporates selection of three-phase vs. single-phase application. Utilizing the device of the present invention, multiple zone operation can be simply accomplished by using multiple units, each with a set of terminals (input and output) and calibration potentiometers each assembled as a card with a suitable rack of matching receptacles. The preferred device will be supplied with low impedance cables for connection to user's transformer and furnace element terminal and include a separate digital readout for visual display of furnace temperature.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A temperature measurement device for measuring a temperature of a furnace heating element, said device comprising:

a first electrical connector for carrying a first input signal from a heating element of a furnace, and a second electrical connector for carrying a second input signal from a transformer of said furnace, wherein said first electrical connector and said second electrical connector are cables sized and calibrated to both transmit power to the heating element and to function as drop resistors;

a voltage measurement device in electrical connection with said first input signal and said second input signal;

a current measurement device in electrical connection with said first input signal and said second input signal;

a resistance measuring device in electrical communication with said voltage measurement device and said current measurement device, said resistance measuring device being adapted to calculate a resistance of said heating element of said furnace; and a temperature calculator in electrical communication with said resistance measuring device, said temperature calculator being adapted to compare said resistance of said heating element with a plurality of predetermined resistance versus temperature relationships to determine a temperature of said heating element corresponding to said resistance of said heating element.

2. The temperature measurement device as claimed in claim 1 wherein said resistance measuring device comprises a summing device for determining a difference in a voltage between said first input signal and said second input signal and a dividing device for dividing a voltage through said heating element by a current through said heating element to determine said resistance of said heating element.

3. The temperature measurement device as claimed in claim 1 wherein said temperature calculator comprises an operational amplifier for measuring a voltage within a predetermined range, an analog to digital converter for converting said voltage into a digital signal, and an electronic lookup table adapted to process said digital signal.

4. The temperature measurement device as claimed in claim 3 wherein said electronic lookup table comprises a computer having a data storage device for storing said plurality of predetermined resistance versus temperature relationships and a microprocessor for converting said voltage to a resistance of said heating element and comparing said resistance with said plurality of predetermined resistance versus temperature relationships to determine the temperature of said heating element.

5. A furnace comprising:

a transformer;

at least one heating element in electrical connection with said transformer;

a vessel for separating said transformer from said at least one heating element, said vessel being dimensioned to hold a work to be heated; and a temperature measuring device comprising:

a first electrical connector in electrical connection with said heating element for carrying a first input signal from said heating element;

a second electrical connector in electrical connection with said transformer for carrying a second input signal from said transformer;

a voltage measurement device in electrical connection with said first electrical connector and said second electrical connector for measuring a voltage of said first input signal and said second input signal;

a current measurement in electrical connection with said first electrical connector and said second electrical connector for measuring a current of said first input signal and said second input signal;

a resistance measuring device in electrical communication with said voltage measurement device and said current measurement device, said resistance measuring device being adapted to calculate a resistance of said furnace; and a temperature calculator in electrical communication with said resistance measuring device, said temperature calculator being adapted to compare said resistance of said heating element with a plurality of predetermined resistance versus temperature relationships to determine a temperature of said heating element corresponding to said resistance of said heating element.

6. The furnace as claimed in claim 5 further comprising at least two power feed throughs connected between said cables and said at least one heating element for carrying power from said cables, through said vessel to said heating element.

7. The furnace as claimed in claim 5 wherein said wherein said first electrical connector and said second electrical connector are cables sized and calibrated to function as drop resistors.

8. The furnace as claimed in claim 5 comprising at least three cables in electrical communication with at least three heating elements.

9. The furnace as claimed in claim 5 wherein said resistance measuring device of said temperature measuring device comprises a summing device for determining a difference in a voltage between said first input signal and said second input signal and a dividing device for dividing a voltage through said heating element by a current through said heating element to determine said resistance of said heating element.

10. The furnace as claimed in claim 5 wherein said temperature calculator of said temperature measuring device comprises an operational amplifier for measuring a voltage within a predetermined range, an analog to digital converter for converting said voltage into a digital signal, and an electronic lookup table adapted to process said digital signal.

11. The furnace as claimed in claim 10 wherein said electronic lookup table of temperature calculator of said temperature measuring device comprises a computer having a data storage device for storing said plurality of predetermined resistance versus temperature relationships and a microprocessor for converting said voltage to a resistance of said heating element and comparing said resistance with said plurality of predetermined resistance versus temperature relationships to determine the temperature of said heating element.

* * * * *